(12) United States Patent
Haddad

(10) Patent No.: US 8,918,522 B2
(45) Date of Patent: Dec. 23, 2014

(54) RE-ESTABLISHMENT OF A SECURITY ASSOCIATION

(75) Inventor: Wassim Haddad, San Jose, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 899 days.

(21) Appl. No.: 12/921,862

(22) PCT Filed: Mar. 12, 2008

(86) PCT No.: PCT/SE2008/050270
§ 371 (c)(1),
(2), (4) Date: Sep. 10, 2010

(87) PCT Pub. No.: WO2009/113921
PCT Pub. Date: Sep. 17, 2009

(65) Prior Publication Data
US 2011/0035585 A1    Feb. 10, 2011

(51) Int. Cl.
| | | |
|---|---|---|
| G06F 15/16 | (2006.01) | |
| H04W 12/02 | (2009.01) | |
| H04L 29/06 | (2006.01) | |
| H04W 12/04 | (2009.01) | |
| H04W 80/04 | (2009.01) | |
| H04W 8/08 | (2009.01) | |
| H04W 8/16 | (2009.01) | |
| H04W 12/12 | (2009.01) | |
| H04W 36/00 | (2009.01) | |
| H04W 76/04 | (2009.01) | |

(52) U.S. Cl.
CPC ........... *H04L 63/0414* (2013.01); *H04W 12/02* (2013.01); *H04L 63/061* (2013.01); *H04W 80/04* (2013.01); *H04L 63/0442* (2013.01); *H04W 8/082* (2013.01); *H04L 63/0435* (2013.01); *H04W 8/16* (2013.01); *H04L 63/1441* (2013.01); *H04L 63/1466* (2013.01); *H04W 12/12* (2013.01); *H04W 36/0011* (2013.01); *H04W 76/041* (2013.01); *H04W 12/04* (2013.01)
USPC .......................................... 709/228; 709/227

(58) Field of Classification Search
USPC ........................................................ 713/162
See application file for complete search history.

(56) References Cited

U.S. PATENT DOCUMENTS 7,269,166 B2 * 9/2007 Koskiahde et al. ........... 370/352
7,330,449 B2 * 2/2008 Takahashi et al. ............ 370/331
(Continued)

FOREIGN PATENT DOCUMENTS

| EP | 1826958 A1 | 8/2007 |
|---|---|---|
| WO | 2006118342 A1 | 11/2006 |
| WO | 2007079628 A1 | 7/2007 |

OTHER PUBLICATIONS

J. Arkko, Ed., et al., "Request for Comments 3971: Secure Neighbor Discovery (SEND)", Mar. 2005, The Internet Society, p. 4, 15.*
Johnson, D. et al. RFC 3775: Mobility Support in IPv6. 165 Pages. Jun. 2004.*
European Search Report Application No. 08724217.8, Apr. 26, 2012, 6 pages.
(Continued)

*Primary Examiner* — Jeffrey R Swearingen
(74) *Attorney, Agent, or Firm* — Rothwell, Figg, Ernst & Manbeck, P.C.

(57) ABSTRACT

A system for re-establishing a session between first and second hosts attached to respective first and second access routers. A connection request is sent from the first host to the first access router, the request containing an EP address claimed by the second host, a new care-of-address for the first host, and a session identifier. Upon receipt of the connection request, the first router obtains a verified IP address for the second access router and sends an on link presence request to the second access router, the request containing at least an Interface Identifier part of the second host's claimed IP address, the cue-of-address. and the session identifier. The second access router confirms that the second host is attached to the second access router. The second access router then reports the presence status to the first access router.

16 Claims, 5 Drawing Sheets

(56) References Cited

U.S. PATENT DOCUMENTS

| | | | |
|---|---|---|---|
| 7,380,124 B1* | 5/2008 | Mizell et al. | 713/171 |
| 7,509,491 B1* | 3/2009 | Wainner et al. | 713/163 |
| 7,616,615 B2* | 11/2009 | Sueyoshi et al. | 370/338 |
| 7,698,436 B2* | 4/2010 | Takusagawa et al. | 709/227 |
| 7,843,871 B2* | 11/2010 | Jagana et al. | 370/328 |
| 7,869,435 B2* | 1/2011 | Seguchi et al. | 370/392 |
| 8,036,182 B2* | 10/2011 | Takeda et al. | 370/338 |
| 8,060,086 B1* | 11/2011 | Jintaseranee et al. | 455/433 |
| 8,369,293 B2* | 2/2013 | Kumazawa et al. | 370/338 |
| 8,428,587 B2* | 4/2013 | Mizuma et al. | 455/435.1 |
| 2002/0026482 A1* | 2/2002 | Morishige et al. | 709/206 |
| 2003/0211842 A1* | 11/2003 | Kempf et al. | 455/411 |
| 2006/0149814 A1* | 7/2006 | Borella | 709/204 |
| 2007/0113075 A1* | 5/2007 | Jo et al. | 713/158 |
| 2007/0254677 A1* | 11/2007 | Venkitaraman et al. | 455/458 |

OTHER PUBLICATIONS

Office Action issued in Chinese Patent Application No. 200880127925.5 on Sep. 26, 2012 wiht English translation, 10 pages.

W. Haddad, "Enabling Source Address Verification via Prefix Reachability Detection; draft-haddad-sava-prefix-reachability-detection-00", Architecture (SAVA), Ericsson Research Nomadic Lab, 14 pages.

W. Haddad, "Using Cryptographically Generated Addresses (CGA) to Secure HMIPv6 Protocol (HMIPv6sec); draft-haddad-mipshop-hmipv6-security-06", Ericsson Rearch, H. Soliman, Qualcomm-Flarion, 2006, 18 pages.

W. Haddad, "Secure Neighbor Discovery (SeND) Optimizations: The OptiSeND Protocol; draft-haddad-mipshop-optisend-03", Ericsson Research, J. Choi, Samsung AIT, J. Laganier, Docomo Euro-Labs, 2007, 16 pages.

* cited by examiner

RE-ESTABLISHMENT OF A SECURITY ASSOCIATION

CROSS-REFERENCE TO RELATED APPLICATION

This application is a 35 U.S.C. §371 National Phase Entry Application from PCT/SE2008/050270, filed Mar. 12, 2008, and designating the United States.

TECHNICAL FIELD

The invention relates to IP mobility and is applicable in particular to maintaining privacy in respect of traffic involving one or more mobile nodes.

BACKGROUND

Mobile IP (MIP), which is described in IETF RFC 3775, allows users of mobile communications devices to move from one network to another whilst maintaining a permanent IP address, regardless of which network they are in. This allows a user to maintain connections whilst on the move. For example, if a Mobile Node (MN) were participating in a Voice Over IP (VoIP) session with a Correspondent Node (CN), which might be fixed or mobile, and, during the session the MN moved from one network to another, without MIP support the MN's IP address may change. This would lead to problems with the VoIP session. Mobile IP relies upon the provision, within a MN's home network, of a Home Agent (HA). The MN is allocated a Home Address (HoA) within the home network, as well as a Care-of-Address (CoA) within a visited network. Packets exchanged between MN and the CN are tunneled between the HA and the MN using the CoA as source/destination address.

Route Optimisation (RO) is a procedure used in mobility networks to improve the efficiency with which messages are sent between a MN and a CN. More particularly, RO allows traffic sent from the CN to the MN to be routed directly to the MN without passing through the HA. Mobility Support in IPv6 (IETF RFC3775 June 2004) describes a RO procedure for messages sent to the MN from a CN. This approach requires (for each location update) that a pair or reachability tests be performed between the MN and the CN. A first test (HoTI/HoT) ensures reachability of the MN at the HoA, and a second (CoTI/CoT) ensures reachability of the MN at the CoA. The HoT and CoT messages each contain a token, with the tokens being combined at the MN to generate a secret (shared with the CN). A subsequent Binding Update (BU) and Binding Acknowledgement are signed with the shared key. RO requires that both the CoA and HoA reachability tests be repeated at regular intervals, e.g. typically every 7 minutes, in order to limit the damage that can be caused by a time shifting attack in which a MN moves to a new network but does not update the CN, resulting in flooding of the old network.

An enhanced RO protocol has been proposed (IETF RFC4866). This enhanced protocol introduces the use of Cryptographically Generated Addresses CGA as HoAs, with BUs being signed with the sender's private key. The use of CGAs avoids the need for further HoA reachability tests after an initial test has been performed: after the initial test, the CN can trust that the MN has not only generated the CGA but that it had the right to do so. As well as improving security, the enhanced RO protocol reduces mobility related signalling.

Various security vulnerabilities are present within the existing RO proposals. In particular, it may be possible for an attacker present on the link between a MN and a CN, i.e. a man-in-the-middle, to observe patterns within packet streams and to thereby track the movements of the MN. An attacker could for example scan BUs sent between a MN and a CN. The BUs will reveal both the HoA and CoA of the MN, and the CNs IP address. By looking for consecutive (or similar) header sequence numbers, the attacker can follow the MN's movements between access networks.

It is desirable to introduce a degree of anonymity and unlinkability into IP packet streams to prevent the tracking of movements of mobile nodes within and between access networks whilst at the same time defending against flooding and related attacks, but to do this efficiently and securely in terms of the set-up signalling involved and the provisioning of mobility. Also it is equally desirable to relieve the mobile node from having to exchange any mobility signalling directly with the corresponding node, as well as to reduce the handoff latency by removing the CoTI/CoT exchange.

SUMMARY

According to a first aspect of the present invention there is provided a method of re-establishing a session between first and second IP hosts attached to respective first and second IP access routers, the session previously having been conducted via a previous access router to which said first host was attached, and where a security association comprising a shared secret has been established between the hosts. The method comprises sending a connection request from said first host to said first access router, said request containing an IP address claimed by said second host, a new care-of-address for the first host, and a session identifier. Upon receipt of said connection request at said first access router, the router obtains a verified IP address for said second access router and sends an on link presence request to the second access router, the request containing at least an Interface Identifier part of the second host's claimed IP address, said care-of-address, and said session identifier. Said second access router confirms that said second host is attached to the second access router using the claimed Interface Identifier, sending to the second host said care-of-address and said session identifier. The second access router then reports the presence status to said first access router. Said second host uses said session identifier to identify said security association, and updates the binding cache entry for said first host with the new care-of-address.

Embodiments of the present may effectively replace the traditional care-of address reachability test which has "plagued" all existing mobility (e.g., MIPv6, OMIPv6, HIP) and multihoming protocols (e.g., SHIM6). In addition, these embodiments defend against man-in-the-middle attacks without requiring the mobile node's involvement. Explicit BU/BA message exchanges are avoided by securely piggybacking a "hint" on a network-based reachability test message sent to the correspondent node after attachment of the mobile node to a local network. The hint points to the previous session. Elimination of the explicit BU/BA exchange reduces system latency. At the same time the procedure makes it difficult for a malicious node to detect that a mobile node has moved from one access network to another.

According to an embodiment of the invention, said first router obtains, together with said verified IP address, a public key of said second access router, and authenticates the presence status report sent by the second access router using said public key. The verified IP address for said second access router is retrieved by the first access router from a trusted network server.

Following receipt of said on link presence request at said second access router, the router obtains a public key of said first access router, and authenticating the request with that key. Said public key of the first access router is retrieved by the second access router from a trusted network server.

Said care-of-address and said session identifier are sent from the second access router to the second host in a Neighbour Discovery message. Said connection request includes a secret key shared between the first and second hosts and associated with said security association, said secret key also being included in a Neighbour Discover response sent from said second host to said access router, the secret key being used by the access routers to authenticate the presence status report.

The invention is applicable in particular to the where said first and second access routers share a pair of group keys (SGK, DGK) that are subsequently used by the routers to generate anonymised Interface Identifiers for use in the source and destination IPv6 addresses of the first and second hosts. In the event that said group keys are not shared by the access routers prior to receipt by the first access router of said connection request, the keys are generated at respective hosts and exchanged by the hosts.

According to a second aspect of the present invention there is provided an access router for use in an IP communication network. The router comprises an input for receiving from a mobile node an attachment request, the request containing a care-of-address acquired by the mobile node, an IPv6 address claimed by a correspondent node of the mobile node, and a session identifier. First processing means obtains a validated IP address for a peer access router behind which the correspondent node should be located, whilst output means forwards an on link presence request to said peer access router using said validated IP address and containing said care-of-address, the claimed IPv6 address, and said session identifier.

According to a third aspect of the present invention there is provided an access router for use in an IP communication network. This comprises an input for receiving from a peer access router an on link presence request containing a care-of-address acquired by a mobile node located behind said peer access router, an IPv6 address claimed by a correspondent node and containing an Interface Identifier part belonging to the access router, and a session identifier, and processing means for confirming that said correspondent node is present on the local link including means for sending said care-of-address and said session identifier to said correspondent node. The router further comprises output means for reporting a link status to said peer access router.

According to a fourth aspect of the present invention there is provided a mobile node for use in an IP communication network. The node comprises processing means for establishing a session with a correspondent node, said session comprising one or more security associations and a session identifier identifying the session, and attachment means for detaching from a previous access router and for attaching to a new access router. The attachment means is arranged to send an attachment request to the new access router, the attachment request containing an IPv6 address of said correspondent node, a care-of-address claimed by said correspondent node, said session identifier, and a prefix reachability request in respect of the Interface Identifier part of the correspondent node's claimed IP address. Input means receives reachability confirmation in respect of said claimed IP address from said access router, whilst a packet processing means is provided for exchanging packets with said correspondent node following receipt of said confirmation.

Following movement of a mobile node to a new access router, the new access router is immediately able to send a new group key to the correspondent node's access router by embedding it in a prefix reachability detection message, i.e. without waiting for an IKEv2 exchange as is the case in the classic PRD, and thus to extend the anonymity environment to the mobile node's new location.

According to a further aspect of the present invention there is provided a method of updating a binding cache entry at a correspondent node, the entry relating to a session previously established between the correspondent node and a peer node, the method comprising sending from a first access router to which the mobile node is attached to a second access router to which the correspondent node is attached, an IPv6 prefix reachability detection request in respect of an IPv6 address claimed by the correspondent node and including in the request a care-of-address acquired by the mobile node and a hint identifying said session, performing a reachability detection check at said second access router and, in the event that reachability is confirmed, using said hint at the correspondent host to identify said session and said binding cache entry, and updating the entry with said care-of-address.

Preferably, said hint is a parameter used by the access routers to anonymise the Interface Identifier parts of source and/or destination addresses contained within packets exchanged between said mobile node and said correspondent node. More preferably, the hint is a parameter used by said first access router to anonymise the IID part of destination addresses contained within packets sent from the mobile node to the destination node. For example, the hint may be a 64 bit destination host identifier (DHID) which is XORed with a 64 bit prefix identifier (PRID) in order to generate an anonymised IID, where PRID is obtained by applying a stream cipher to a pseudo-random number (PRN) and first group key (SGK) shared by the access routers. A new PSN is generated by said mobile node for each packet using a key shared between the mobile node and the correspondent node, and is included in a packet header field.

DETAILED DESCRIPTION

Figure 1:
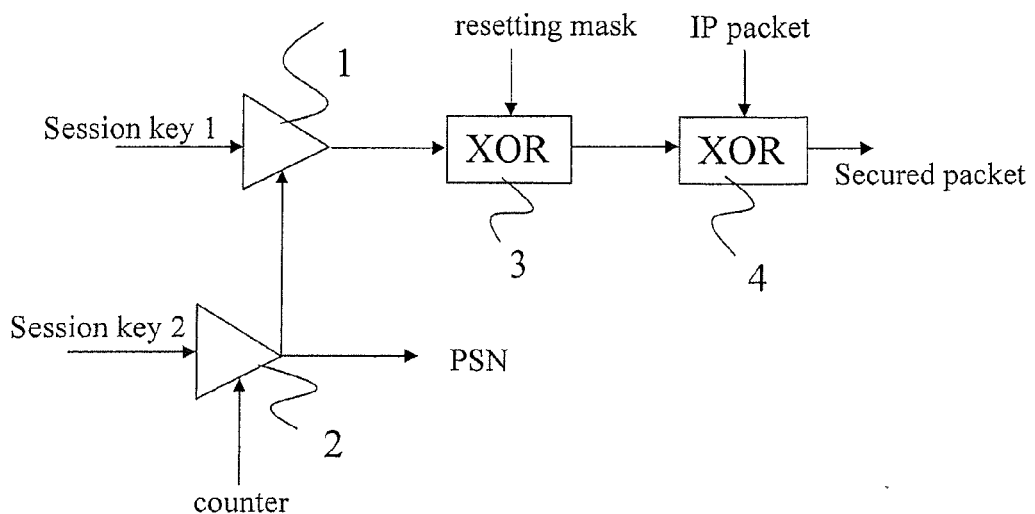
FIG. 1 illustrates schematically a process for generating an encryption pad at an IP packet sender.

There will now be described an IP mobility protocol with improved security. This protocol makes use of an encryption function known as a "One Time Pad Encryption" (OTPE) function. With reference to FIG. 1, this function comprises a stream cipher 1 which receives as a first input a first 128 bit session key (Session key 1) and as a second input a 64 bit pseudo-random number. The pseudo-random number is in turn generated by a block cipher 2 which receives as a first input a second 128 bit session key (Session key 2) and a counter value (Counter). The block cipher is preferably, but not necessarily, an AES encryption function (e.g. in ECB mode). For each packet to be secured using OTPE, the counter value is incremented by 1. The output of the block cipher 2 is a new pseudo-random number (PSN). This is fed into the stream cipher which is clocked to generate a pad of appropriate length to secure an IP packet, including the header and payload. Bit positions of the pad which correspond to positions of the packet which are not to be encrypted, e.g. source and destination addresses in the packet header, are reset to "0" by a first XOR function 3.

The pad output by the first XOR function 3 is then applied to a first input of a second XOR function 4, which receives at its second input the IP packet to be secured. The output of the second XOR function is a cryptographically secured representation of the original IP packet. In order to allow a receiver to decrypt the packet, the packet must include the used pseudo-random number. As will be discussed below, the pseudo-random number is included in the IPv6 packet header.

Considering now the receiver, in order to avoid replay attacks, an initial check is performed using the pseudo-random number and Session key 2 as inputs to the block cipher. The result corresponds to the counter value. The receiver maintains a counter value window, and the packet is accepted only if the determined counter value lies within this window. Assuming that it does, the pseudo-random number part of the packet is applied to a first input to a stream cipher, whilst the first Session key is applied to a second input. The output of the stream cipher is the original pad. Bits of the pad corresponding to bits of the packet which are not encrypted are then set to "0". The modified pad is applied to a first input of a further XOR function, with the second input receiving the secured packet. The output of the XOR function is the decrypted packet.

IPv6 provides for IP addresses having a 64 bit Interface Identifier (IID) suffix and a 64 bit network prefix. Typically, the IID is chosen by the host terminal and is sent to an Access Router (AR) to which the host is connected, during an attachment procedure. The network prefix part of the IP address is a fixed address of the AR and the host is informed of this in an AR advertisement message. By allowing a host to refresh its IID in each data packet sent to a destination, anonymity can be enabled. This means that no particular IID is disclosed in more than one data packet during an ongoing session. In addition to changing the sender's IID in each data packet, it is highly desirable to also change the receiver's (i.e. destination) IPv6 address. The OTPE function described above can be used to generate the randomized IID in a process termed Anonymous OTPE (AOTPE).

AOTPE relies upon an acceptance that it is extremely difficult to ensure anonymity for hosts attached to the same access network, i.e. sharing a common AR. Consider for example an access network to which two mobile terminals are attached. Each of these terminals will know that traffic not intended for itself is destined to the other terminal. Furthermore, regardless of the source and destination addresses used in packets sent over the local link, the Media Access Control (MAC) addresses used should remain static. Applying this in the case of a set of hosts attached to a first AR and communicating with a set of hosts attached to a second AR means that there is no reduction in the level of security if keys used to provide anonymity of IIDs are shared between the two sets of hosts. Anonymity is provided only in respect of third parties analysing traffic travelling between the two ARs.

Consider by way of example a source host S trying to establish a connection with a destination host D. Both S and D are assumed to make use of respective Cryptographically Generated Addresses (CGAs). CGAs have been discussed above in the context of enhance Route Optimisation. It will be appreciated that the use of CGAs requires hosts to possess a public-private key pair. The possession of such a key pair proves useful in ensuring end-to-end security as will be discussed further below. It is assumed that S is attached to an access router AR(S) and that D is attached to an access router AR(D). As part of their respective access router attachment procedures, S will have obtained from AR(S) a network prefix SP, and D will have obtained from AR(D) a network prefix DP. Prior to running a key exchange protocol (e.g. IKEv2) with D, S requests that AR(S) generate a group key SGK. This group key is a key assigned by AR(S) to the network prefix used by D, i.e. DP. The same group key will be provided for all hosts using the network prefix SP to communicate with destination hosts using the network prefix DP, i.e. the binding {SGK,SP,DP} is made. Group keys have a limited lifetime. In addition, S generates a unique sender host identity (SHID) and a unique destination host identity (DHID) using the keys shared with D, and sends these to AR(S).

S then initiates the key exchange protocol with D using a static pseudo-IPv6 (CGA) address. When the initiating message (e.g. IKEv2 or HIP) is received by D, D requests that AR(D) generate a group key DGK. This key is similarly bound to DP and SP, i.e. {DGK,DP,SP}. D also generates SHID and DHID and provides these to AR(D). AR(D) and AR(S) then securely exchange SGK and DGK. SHID is subsequently used by AR(S) to identify packets received from AR(D).

Table 1 below shows the bindings that are maintained at S and D, assuming that each host has established bindings for n different peer hosts (DP1, DP2 . . . DPn in the case of S, and SP1, SP2, . . . SPn in the case of D). Although not shown in the Tables, S and D also maintain mappings between SHID and D's fixed IP address and between DHID and S's fixed IP address.

Figure 2:
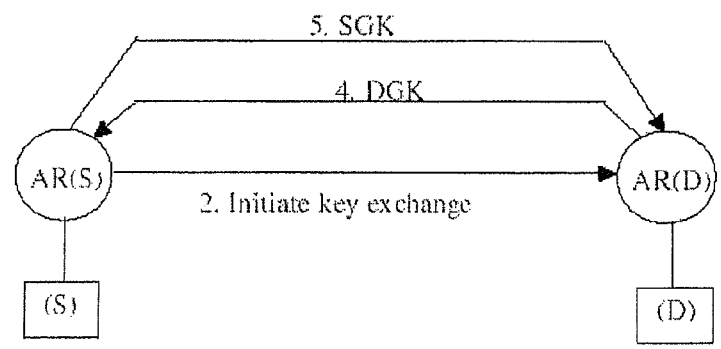
FIG. 2 illustrates signalling associated with setting up a pad for encrypting and anonymising IP packets.

Table 2 below shows the bindings maintained at AR(S), assuming that n hosts are currently attached using MAC addresses 1 to n and interface identifiers IID1 to IIDn (of respective CGA IP addresses). A corresponding set of bindings are maintained at AR(D). FIG. 2 illustrates schematically the required message exchange which takes place prior to, and within the key exchange protocol. Of course, at the end of the key exchange protocol, in addition to sharing the host identities DHID and SHID, the hosts S and D will share the two OTPE keys, namely Session key 1 and Session key 2 of FIG. 1.

In order to achieve encryption and anonymity, for each packet sent by S to D, S carries out the following:
Packets are generated at S and include the fixed IPv6 source and destination address.
S applies the OTPE protocol to encrypt the payload and portions of the packet header, e.g. the sequence number, but excluding the source and destination addresses.
S includes PSN within a new header field and sends the packet to AR(S).
A new IPv6 IID will be used for D in the following way:
AR(S) will use the same mode applied to generate PSN, in order to generate a random identifier, called PRID, that is PRID=$f_{sc}$(PSN,SGK), where $f_{sc}$ represents the stream cipher. NB. AR(S) knows PSN as it forms the IID part of the source IP address.
After generating PRID, AR(S) computes the new destination IPv6 IID by XORing PRID and SHID, i.e., new IID=PRID XOR SHID. The new IID is then concatenated with the destination network prefix DP to generate a full IPv6 destination address.

Figure 3:
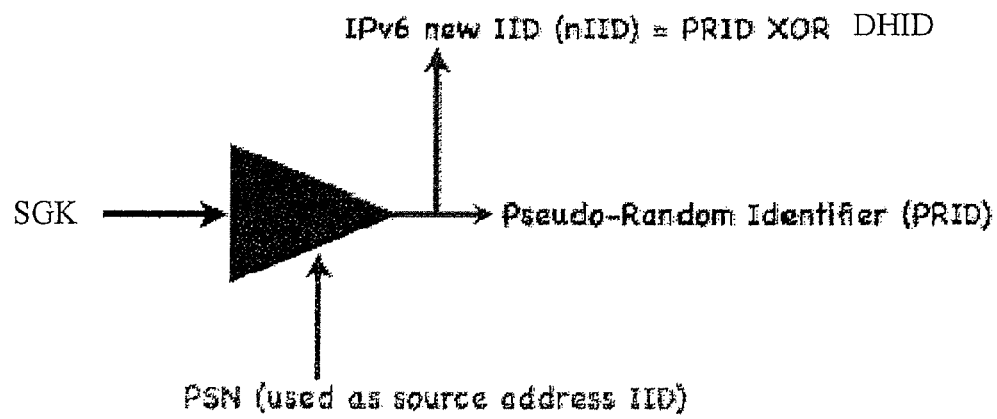
FIG. 3 illustrates schematically a process for generating a new IPv6 IID for a destination host.

This mechanism is illustrated in FIG. 3.

In the same way, AR(S) generates a new interface identifier for S, i.e. new IID=PRID XOR DHID. The new IID is concatenated with the source network prefix to generate a full IPv6 source address.

AR(S) substitutes the anonymised destination and source addresses into the packet header, replacing the fixed addresses, and the packet is sent by AR(S) towards D.

Figure 4:
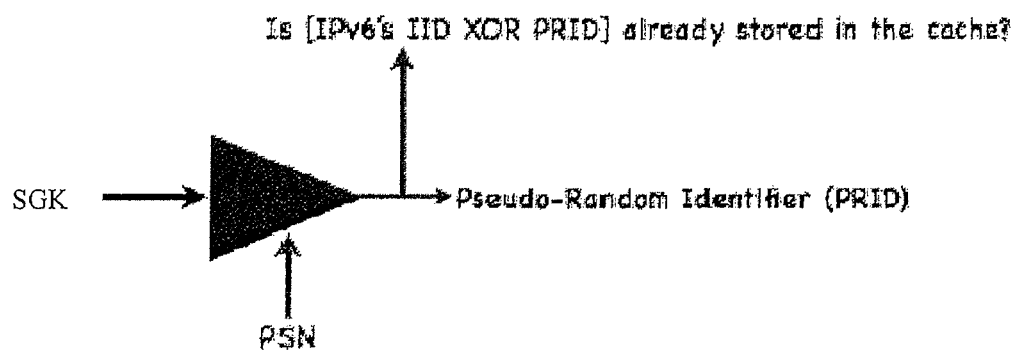
FIG. 4 illustrates schematically a process for recovering, at an access router of an IP packet receiver, a destination identity.

Packets destined for D arrive at AR(D) as a result of the network prefix of the destination address. AR(D) performs a verification procedure as follows:

AR(D) checks if the source address network prefix is stored in its cache memory. After that, it uses the corresponding SGK together with the PSN, included in the packet header, to generate the PRID, as illustrated in FIG. 4.

The next step after generating the PRID is to XOR it with the destination address IID to generate a SHID. The cache memory at AR(D) is then searched using the resulting 64-bit value as key. If the SHID is found within the cache, AR(D) identifies the associated static IID for D and replaces the anonymised destination address IID with this fixed IID.

Using the verified SHID, AR(D) is able to identify the MAC address of D. AR(D) uses the MAC address to forward the packet to D.

Upon receipt of the packet at D, D repeats the procedure to identify the correct SHID. Using the verified SHID, it identifies the correct Session Key 2. D applies the PSN (included in the packet header) and Session Key 2 to identify a counter value. If the counter value falls within a current window, the packet is accepted. Session Key 1 and the PSN are then used to decrypt the packet using the OTPE protocol as described above. D is also able to identify the fixed IID of S, and substitutes this into the packet header for the anonymised source IID before passing the packet to the higher protocol layers.

It will be readily appreciated that the procedure is effectively reversed when D is the packet sender, and S is the packet receiver. In this case, upon receipt of a packet at AR(S), AR(S) recovers and verifies DHID and performs the necessary substitution (including substituting the anonymised source address IID for the fixed IID). It then identifies the MAC address corresponding to DHID and forwards the packet to S over the local link.

In order to allow a MN to be always reachable, some mechanism must be introduced to provide a static point of contact for the MN. This might involve the use of a Home Address (HoA) as discussed above with reference to Mobile IP, or it might involve the use of the Host Identity Protocol (HIP) according to which hosts are reachable at a fixed Host Identity. In this case, the fixed IP address of the MN referred to above (and for which the anonymised address is substituted) becomes a Care-of-Address (CoA), with a mobility layer (binding cache) within the MN performing a translation between the CoA and the HoA or HI.

It will be appreciated that the procedure described above introduces sender and receiver anonymity into a packet flow, as well as providing for the encryption of payload (and possibly header) data. It does not however provide a defense against a man-in-the-middle attack in which an attacker interposes himself between the two access routers, negotiating separate Session keys, group keys, and DHIDs/SHIDs with each party (MN and CN).

Figure 5:
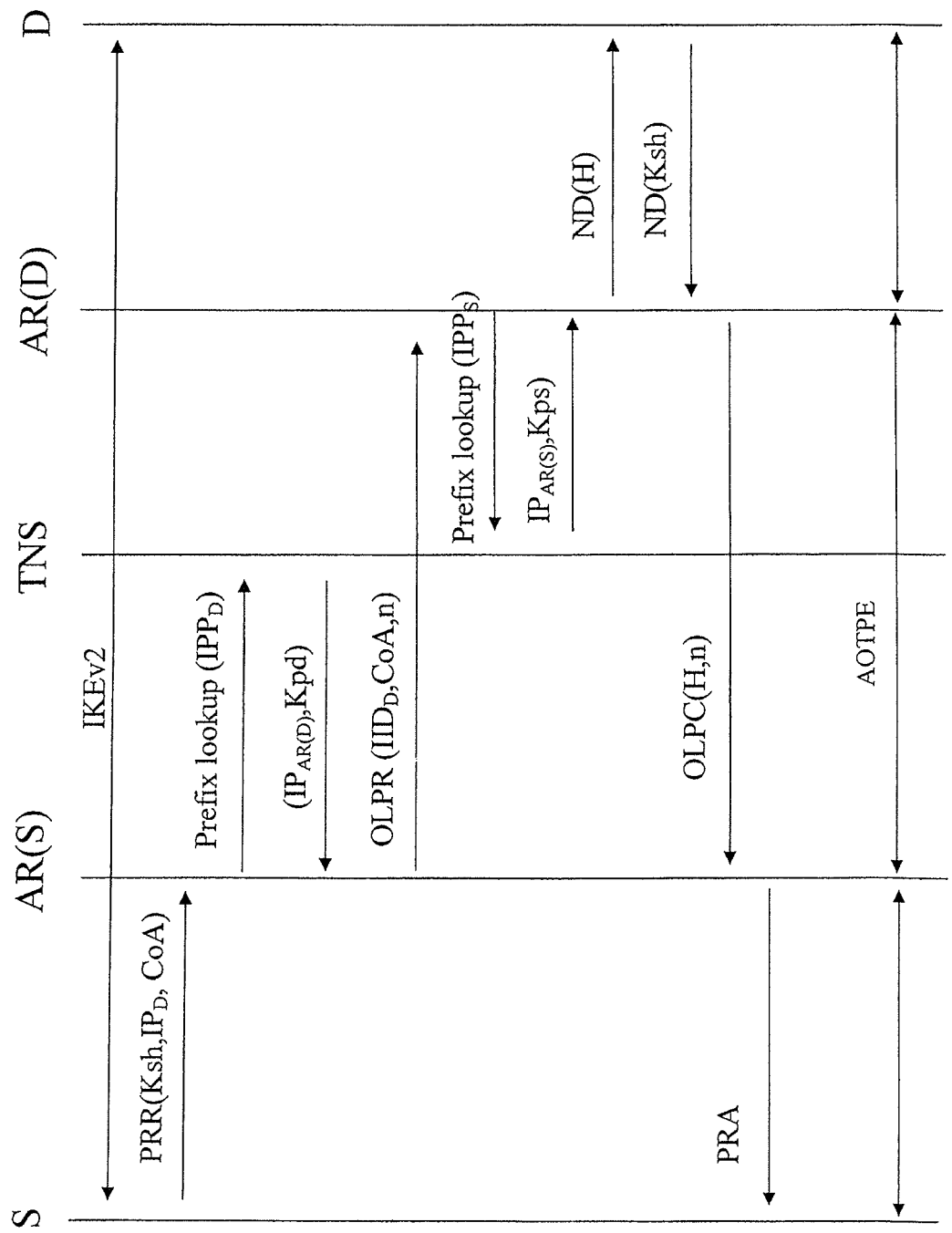
FIG. 5 illustrates signalling associated with a prefix reachability detection scheme forming part of a mobility protocol.
Figure 6:
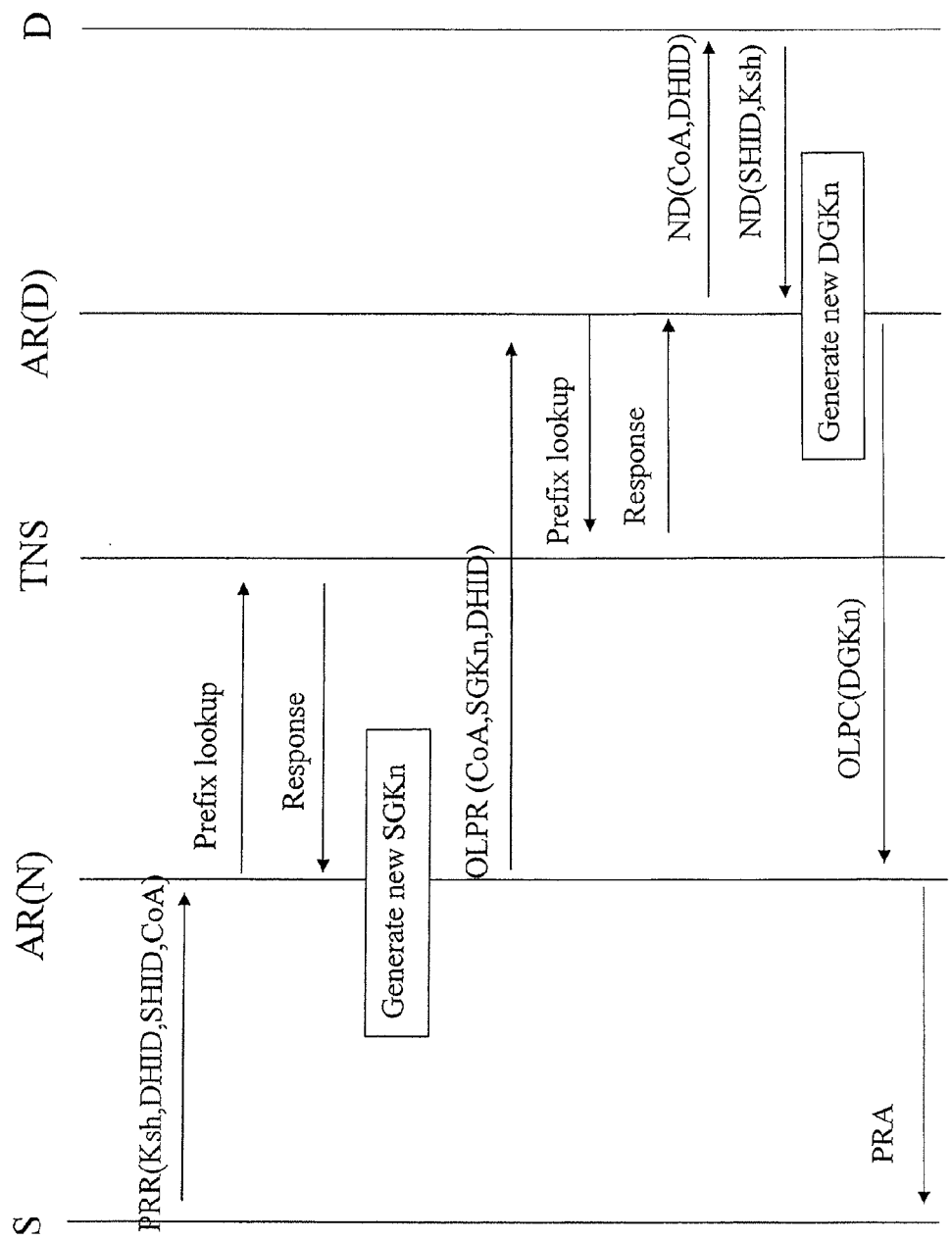
FIG. 6 illustrates mobility signalling following movement of a mobile node from a first access router to a new access router.

In order to address these security issues, prior to initiating the AOTPE process, a Prefix Reachability Detection (PRD) process is implemented as illustrated in FIG. 5. Such a process is described in "Enabling Source Address Verification via Prefix Reachability Detection" published as IETF Internet Draft draft-haddad-sava-prefix-reachability-detection-00 The main components of PRD are a secure and trustable "prefix routing lookup" mechanism and a secure on-demand query/response between the communicating endpoints and their first hop routers. This approach enables one endpoint S to check that the topological location of the other endpoint D maps correctly to that other endpoint's claimed IP address prefix.

Following the IKv2 exchange between S and D, S requests AR(S) to perform a PRD check in respect of D's IP address. For this purpose, S sends a Prefix Reachability Request (PRR) message to AR(S) which carries a secret, Ksh, D's fixed IP address (IPd), and S's fixed IP address (CoA). Ksh is derived from the hash of the IKEv2 session key Ks and a hint, H. The PRR message is signed with S's private key and the option carrying Ksh is encrypted with AR(S)'s public key.

Both S and D use the same method to derive Ksh, e.g.

$$Ksh=First[128,Hash[Hash(Ks)|IID(C)|IID(S)]]$$

Where:
First(X,Y) indicates a truncation of "Y" data so that only the first "X" bits remain to be used.
Hash is a secure cryptographic function.
Ks is IKEv2 session key.
IID(D)=(D)'s IP address interface identifier.
IID(S)=(S)'s IP address interface identifier.
"|" (concatenation): indicates bytewise concatenation, as in A|B. This concatenation requires that all of the octets of the datum A appear first in the result, followed by all of the octets of the datum B.
IID(D)|IID(S)=Hint (H).

AR(S) receives the PRR and attempts to validate it using S's public key. Assuming that validation is successful, AR(S) performs a "prefix lookup" using D's 64-bit prefix (IPPd), in order to learn the corresponding IP address ($IP_{AR(D)}$) and public key Kpd of AR(D). It is assumed that some trusted network server (TNS) is provided for this purpose, and that a secure look-up protocol is available. AR(S) then sends an "On Link Presence Request" (OLPR) message to AR(D), which carries D's 64-bit interface identifier ($IID_D$), S's CoA including its 64-bit prefix (IPPs), and a 64-bit nonce (n). The IP destination address used in the OLPR message is the one sent to AR(S) in response to its query related to D's prefix. AR(S) authenticates the OLPR message with Ksh and signs it with its own private key.

Upon receiving an OLPR message, AR(D) starts the validation procedure by performing a look-up on S's prefix in order to fetch the corresponding IP address ($IP_{AR(s)}$) and public key(s), Kps. Again, this relies upon the existence of a trusted network server and a secure look-up protocol. AR(D) then checks the validity of the IP source address used in the OLPR message by confirming that it matches the IP address returned from the trusted server. This represents a first level of defense, but it will not prevent (at this stage) an attack using a spoofed source address. AR(D) then checks whether or not the requested IID is present on the local link For this purpose, AR(D) uses the neighbor discovery protocol (described in RFC2461) and inserts S's CoA in the ND message. AR(D) authenticates (or signs) the ND message using its private key Kpd, before sending it on the local link.

Assuming that D is indeed present on the local link, it receives the ND message and determines the hint H (which may be explicitly carried in the message or reconstructed from the Interface Identifiers). D updates its binding cache entry for S's IP address using the CoA, and replies to AR(D) with an ND message containing Ksh (calculated using the above formula). Ksh is inserted in an option encrypted using AR(D)'s public key, Kpd. The message is also signed using D's private key.

AR(D) validates the ND message using its public key, and decrypts Ksh using its own private key. AR(D) uses Ksh to check the authenticity of the OLPR message previously received from AR(S). It is noted that this authentication step is not computationally expensive. If the message is authenticated, then AR(D) proceeds to check the signature using its public key Kps (a more computationally expensive process), then sends back an "On Link Presence Confirmation (OLPC)" message to AR(S). The OLPC message carries the nonce sent in the OLPR message. In addition, the OLPC message is authenticated with the shared key Ksh and signed with AR(D)'s private key.

In the event that AR(D) does not get a valid reply from D (i.e., a message conveying Ksh), AR(D) sends an "On link Prefix Denial (OLPD)" message to AR(S). It follows that the OLPR message cannot be authenticated and in this case, the OLPD is signed with AR(D)'s private key.

After checking the validity of OLPC/OLPD using Ksh and Kpd, AR(S) notifies S of the success/failure of its PRR message. This is done by sending a "Prefix Reachability Acknowledgment" (PRA) message to S. The PRA message is signed with AR(S)'s private key. The OLPD message is reflected in the PRA message by setting the "Alert" (A) bit. Following receipt of a valid PRA message, S can decide whether or not to pursue the data exchange with D, and in particular to perform the AOTPE establishment phase.

The PRD procedure can be repeated periodically during the data exchange between S and D and indeed this is desirable to ensure that one of the parties does not subsequently move out from behind its access router and initiate a "sniffing" attack on the link between the routers (using SGK and DGK). In such an event, the endpoint that remains behind its access router will determine from the repeat PRD procedure that the other endpoint has moved and can stop sending traffic. This event may also trigger the access routers to renegotiate the group keys DGK, SGK.

Following the running of the AOTPE establishment phase, the endpoints S and D share a pair of session keys (Session Key 1 and 2) and DHID/SHID. The access routers AR(S) and AR(D) also share DHID/SHID, as well as the group keys SGK and DGK. Following the running of the PRD process, the endpoints can be confident that they are communicating directly with one another and not via a man-in-the middle. Also, as described, repeating the PRD process at regular intervals allows the access routers to detect when an endpoint has left the local network and to take appropriate action.

FIG. 5 illustrates a signalling flow associated with this initial PRD process, assuming that all authentications and checks are carried out successfully.

Consider now the case where one of the endpoints, S, detaches from AR(S) and attaches to a new access router, AR(N). It will be appreciated that shortly after the move a repeat of the PRD process between AR(S) and AR(D) will detect this movement, and new group keys will be negotiated [preventing S from launching a man-in-the-middle attack between AS(S) and AR(D)]. S will determine the network prefix of AR(N) and its public key (typically broadcast by the access router in a RtAdv message assuming use of the SeND protocol). S then configures a new fixed (CGA) IP address (CoA) using the network prefix and a static IID. In order to allow S to continue with its ongoing communication with D, S must communicate the new CoA to D. As a first step in this process, S sends a PRR message to AR(N) in order to trigger AR(N) to perform a Prefix Reachability Detection (PRD) test on D's IID. As before, the PRR message carries the key shared between S and D, namely Ksh. This Ksh may be the same key used previously, or it may be a refreshed key. Refreshing could be achieved, for example, by including a counter in the formula used to generate Ksh:

$$Ksh=First[128,Hash[Hash(Ks)|IID(C)|IID(S)|COUNT]]$$

where COUNT is equal to zero on the first PRD, then its value is increased by 1 (or more) for each new run. The updated count may need to be sent in the subsequent signaling.

S also includes in the PRR message its static identifier, e.g. HoA or HI, the previously determined DHID and SHID, and its new CoA. The PRR may be piggybacked on a RtSol message protected using SeND/OptiSeND. Upon receipt of the PRD message, AR(N) fetches AR(D)'s public key and IP address from the trusted network server, using D's claimed prefix. AR(N) then determines whether or not it already has a shared SGKn/DGKn with AR(D). These group keys may exist due to previous communication between hosts located behind AR(N) and AR(D). In the event that no group keys are already shared by the access routers, AR(N) generates a new group key SGKn.

AR(N) then sends an OLPR message to AR(D) and includes in this S's static identifier as well as the CoA, inserted in a new option(s). AR(N) also includes in the OLPR a new group key SGKn, if one was generated, as well as DHID, encrypted with AR(D)'s public key, Kps. DHID will act as a session identifier to D.

Upon receipt of the OLPR at AR(D), AR(D) validates AR(N) using the trusted server and the procedure described above. It then checks for D's presence on the local link at the IID contained within the OLPR, including S's static identifier, CoA and the DHID in the ND message. D uses DHID to fetch the previously negotiated Security Association, including Session keys 1 and 2, and to update its binding cache entries with the new CoA. Assuming that D is present on the local link, it returns Ksh to AR(D), and AR(D) uses this key to authenticate the OLPR as "belonging" to S. D also includes in the ND that it sends to AR(D), the previously used SHID. AR(D) generates a new group key DGKn if necessary, and then updates its binding cache entry with DHID and SHID and the new group keys.

The next step is for AR(D) to send an OLPC to AR(N) in the event that all procedures have been completed successfully, including if necessary DGKn encrypted with AR(S)'s public key. Otherwise AR(D) returns an OLPD denial. In the case that AR(S) receives an OLPC and is able to validate the signature, it sends a PRA to S.

At this stage, S can be confident that D is located within the network that owns the network prefix that D wishes to use, and vice versa. Furthermore, S and D can be confident that they are communicating directly with one another and not via a man-in-the-middle attacker. S and D can begin sending packets to one another using the AOTPE procedure described above.

Figure 7:
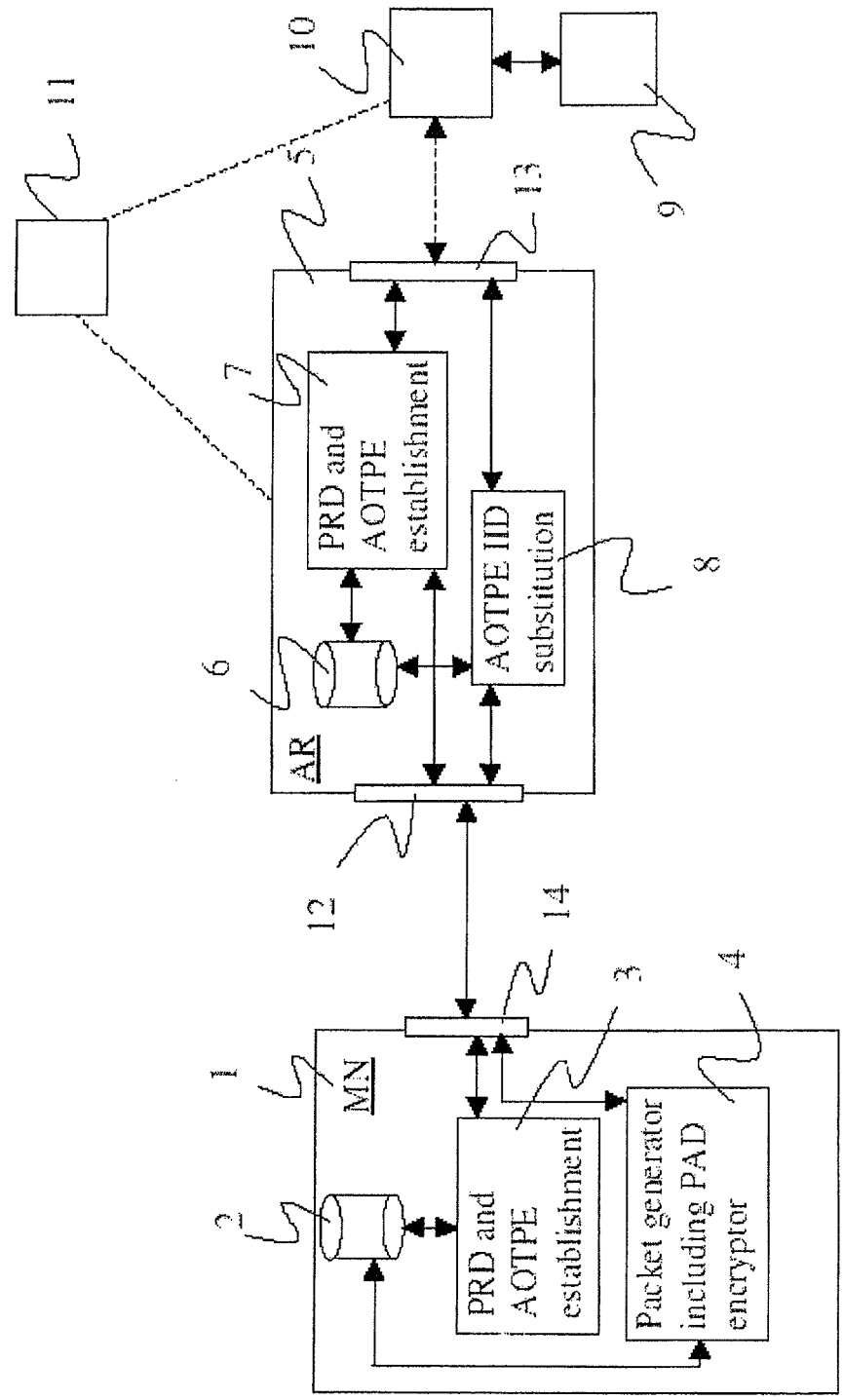
FIG. 7 illustrates schematically a mobile node and access router suitable for use in mobility protocol embodying the present invention.

FIG. 7 illustrates schematically a mobile node (S) and an access router suitable for implementing the mobility protocol presented here. Within the MN 1 there is provided a memory 2 for storing DHID, SHID and other required parameters. A functional block 3 performs the AOTPE negotiation with a peer node via the ARs, whilst a functional block 4 is responsible for on-the-fly pad encryption (and decryption) of packets, including incorporating into outgoing packets the appropriate PSN. An interface 14 connects the MN to the AR. Within the access router 5 a database 6 stores all session related data (see Table 2 below), whilst a functional block 7 is responsible for PRD and AOTPE establishment. A further functional block 8 handles on-the-fly IID substitution for incoming and outgoing packets, as well as local network routing based upon DHID and SHID. A first interface 12 connects the AR to the MN, whilst a second interface 13 connects it to the CN. Also illustrated in FIG. 7 are correspondent node CN 9, and a CN access router 10. Also illustrated is a trusted server 11.

The procedure described above efficiently integrates a prefix reachability test with the IP address anonymisation setup process. The signalling is very efficient as it relieves S from miming a care-of address reachability test (which may be susceptible to a spoofing attack) with D, whilst also relieving it from exchanging a BU/BA following the reachability test. Compared to conventional mobility protocols, four end-to-end messages are replaced by two AR-to-AR messages for each IP handoff. The mobile node only has to send a single local (on-link) message to its access router. Of course, efficiency savings are even greater in the (not uncommon) case where the MN is talking to multiple CNs at the same time, as the MN needs to send only a single PRR message to the new access router. As well as improving security, handoff latency is greatly reduced.

It will be appreciated by those of skill in the art that various modifications may be made to the above described embodiments without departing from the scope of the present invention. For example, whilst in the example procedure described above S initiates the PRD test upon moving to a new access router, the PRD procedure may in fact be initiated by D. It will also be appreciated that the invention is applicable to handling multi-homed devices, i.e. devices having multiple parallel interfaces. In this case, the switch from one interface to another is analogous to a mobile node moving from one access router to another.

According to another modification to the procedure described above, it may be desirable to refresh the SHID and DHID at each handoff in order to mask the mobile node's mobility to the correspondent node's access router. In this case, the new access router will just receive a new DHID from the mobile node upon attachment. This DHID is pre-computed by the mobile node and pre-stored by the correspondent node in the corresponding binding cache entry (BCE). In this case, if the mobile node's previous access router and the new one can talk to one another, it becomes difficult for the previous one to know if the same mobile node is now attached to the new access router. This will also make it hard for the access router on the mobile node's side to trace the mobile node when it moves away from its link to a neighbouring access router.

TABLE 1

Binding prefixes and identifiers

On (S) side

| DP1 | SHID1 | DHID1 |
|-----|-------|-------|
| DP2 | SHID2 | DHID2 |
| DP3 | SHID3 | DHID3 |

On (D) side

| DP1 | SHID1 | DHID1 |
|-----|-------|-------|
| DP2 | SHID2 | DHID2 |
| DP3 | SHID3 | DHID3 |

TABLE 2

On the AR(S) side:

| | | Binding between parameters and MAC address | | Binding Prefixes and Group Key | |
|---|---|---|---|---|---|
| MAC Address(1) | IID1 | OptiSEND_Key(1) + CGA Public Key(1) | H(SHID1) | DP1 | SGK1 |
| MAC Address(2) | IID2 | OptiSEND_Key(2) + CGA Public Key(2) | H(SHID2) | DP2 | SGK2 |
| MAC Address(n) | IIDn | OptiSEND_Key(n) + CGA public Key(n) | H(SHIDn) | DPn | SGKn |

IID = IPv6 Interface Identifier used by a node when attaching to the AR link
DP = Destination Prefix
SGK = Group Key assigned to DP

The invention claimed is:

1. A method of re-establishing a session between first and second hosts attached to respective first and second access routers, the session previously having been conducted via a previous access router to which said first host was attached, and where a security association comprising a shared secret has been established between the first and second hosts, the method comprising:
    the first access router receiving a connection request from said first host, said connection request containing an IP address claimed by said second host, a new care-of-address for the first host, and a session identifier;
    the first access router, upon receipt of said connection request, obtaining a verified Internet Protocol (IP) address for said second access router and sending an on link presence request to the second access router, the on link presence request containing at least an interface identifier (IID) part of the second host's claimed IP address, said care-of-address, and said session identifier,
    wherein said second access router is configured to: confirm that said second host is attached to the second access router using the IID, send to the second host said care-of-address and said session identifier, and send to the said first access router a presence status message reporting the presence status; and
    the first access router receiving the presence status message,
    wherein said first and second access routers share a pair of group keys that are used by the routers to generate anonymized Interface Identifiers for use in both source and destination Internet Protocol version 6 (IPv6) addresses of the first and second hosts, and
    wherein a first group key SGKn is generated by said first access router upon receipt of the connection request from the first host and is included in the on link presence request sent to the second access router, and a second group key DGKn is generated by the second access router upon confirmation that the second host is attached to the second access router at its claimed IP address and is included in the presence status report sent to the first access router.

2. The method according to claim 1, further comprising, at said first access router, obtaining together with said verified IP address, a public key of said second access router, and authenticating the presence status report sent by the second access router using said public key.

3. The method according to claim 1, wherein the verified IP address for said second access router is retrieved by the first access router from a trusted network server.

4. The method according to claim 1, further comprising, following receipt of said on link presence request at said second access router, obtaining a public key of said first access router, and authenticating the request with that key.

5. The method according to claim 4, wherein said public key of the first access router is retrieved by the second access router from a trusted network server.

6. The method according to claim 1, said connection request being carried in a router solicitation message.

7. The method according to claim 1, wherein said care-of-address and said session identifier are sent from the second access router to the second host in a Neighbour Discovery message.

8. The method according to claim 7, further comprising including in said connection request a secret key shared between the first and second hosts and associated with said security association, said secret key also being included in a Neighbour Discovery response sent from said second host to said second access router, the secret key being used by the first and second access routers to authenticate the presence status report.

9. The method according to claim 8, wherein said IP address claimed by the second host is a cryptographically generated Internet Protocol version 6 (IPv6) address and said Neighbour Discovery response is signed with the second host's private key and verified at the second access router using the corresponding public key.

10. The method according to claim 1, wherein said care-of-address is a cryptographically generated Internet Protocol version 6 (IPv6) address and said connection request is signed with the first host's private key and verified at the first access router using the corresponding public key.

11. The method according to claim 1, wherein, in the event that said group keys are not shared by the access routers prior to receipt by the first access router of said connection request, the keys are generated at respective hosts and exchanged by the hosts.

12. The method according to claim 1, wherein the session identifier is for identifying a security association comprising one or more keys.

13. The method according to claim 12, wherein the session identifier is generated by the first host using a key shared with the second host.

14. An access router for use in an IP communication network and comprising:
 a first interface configured to receive from a mobile node an attachment request, the request containing a care-of-address acquired by the mobile node, an Internet Protocol version 6 (IPv6) address claimed by a correspondent node of the mobile node, and a session identifier;
 a processor configured to obtain a validated Internet Protocol (IP) address for a peer access router behind which the correspondent node is located, in response to the attachment request;
 a second interface configured to forward an on link presence request to said peer access router using said obtained validated IP address and containing said care-of-address, the claimed IPv6 address, and said session identifier, wherein the access router and the peer access router share a pair of group keys that are used by the access router and the peer access router to generate anonymized Interface Identifiers for use in both source and destination Internet Protocol version 6 (IPv6) addresses of the mobile node and the correspondent node, and
 wherein a first group key SGKn is generated by said access router upon receipt of the request from the mobile node and is included in the on link presence request sent to the peer access router, and a second group key DGKn is generated by the peer access router upon confirmation that the correspondent node is attached to the peer access router at its claimed IP address and is included in a presence status report sent to said access router.

15. An access router for use in an Internet Protocol (IP) communication network and comprising:
 an interface configured to receive from a peer access router an on link presence request containing a care-of-address acquired by a mobile node located behind said peer access router, an IPv6 address claimed by a correspondent node and containing an Interface Identifier part belonging to the access router, and a session identifier;
 a processor configured to confirm that said correspondent node is present on the local link and configured to send said care-of-address and said session identifier to said correspondent node; and
 an access router (AR) interface configured to report a link status to said peer access router,
 wherein the access router and peer access router share a pair of group keys that are used by the access router and the peer access router to generate anonymized Interface Identifiers for use in both source and destination Internet Protocol version 6 (IPv6) addresses of the mobile node and the correspondent node, and
 wherein a first group key SGKn is generated by said peer access router upon receipt of an attachment request from the mobile and node and is included in the on link presence requeset sent to the access router, and a second group key DGKn is generated by the access router upon confirmation that the correspondent node is attached to the access router at its claimed IP address and is included in the link status report sent to said peer access router.

16. A mobile node for use in an Internet Protocol (IP) communication network and comprising:
 a first processor configured to establish a session with a correspondent node, said session comprising one or more security associations and a session identifier identifying the session;
 a mobile node (MN) interface configured to detach from a previous access router and to attach to a new access router and arranged to send an attachment request to the new access router, the attachment request containing an IPv6 address of said correspondent node, a care-of-address claimed by said correspondent node, said session identifier, and a prefix reachability request in respect of the Interface Identifier part of the correspondent node's claimed IP address, the correspondent node attached to a peer access router;
 a second processor configured to receive reachability confirmation in respect of said claimed IP address from said new access router; and
 a packet generator configured to exchange packets with said correspondent node following receipt of said confirmation,
 wherein the and new access router and peer access router share a pair of group keys that are used by the the new access router and peer access router to generate anonymized Interface Identifiers for use in both source and destination Internet Protocol version 6 (IPv6) addresses of the mobile node and the correspondent node, and
 wherein a first group key SGKn is generated by said new access router upon receipt of the request from the mobile node and is included in an on link presence request sent to the peer access router, and a second group key DGKn is generated by the peer access router upon confirmation that the correspondent node is attached to the peer access router at its claimed IP address and is included in a presence status report sent to said new access router.

* * * * *

UNITED STATES PATENT AND TRADEMARK OFFICE
CERTIFICATE OF CORRECTION

PATENT NO. : 8,918,522 B2  
APPLICATION NO. : 12/921862  
DATED : December 23, 2014  
INVENTOR(S) : Haddad Page 1 of 1

It is certified that error appears in the above-identified patent and that said Letters Patent is hereby corrected as shown below:

On the Title Page, in Item (57), under "ABSTRACT", in Column 2, Line 4, delete "EP" and insert -- IP --, therefor.

On the Title Page, in Item (57), under "ABSTRACT", in Column 2, Line 11, delete "cue-of-address." and insert -- care-of-address, --, therefor.

On Page 2, in Item (56), under "OTHER PUBLICATIONS", in Column 2, Line 2, delete "wiht" and insert -- with --, therefor.

In the Specification

In Column 8, Line 57, delete "link" and insert -- link. --, therefor.

In Column 11, Line 13, delete "miming" and insert -- running --, therefor.

In the Claims

In Column 14, Line 28, in Claim 15, delete "mobile and node" and insert -- mobile node --, therefor.

In Column 14, Line 29, in Claim 15, delete "requeset" and insert -- request --, therefor.

In Column 14, Line 56, in Claim 16, delete "the and" and insert -- the --, therefor.

Signed and Sealed this  
Twenty-seventh Day of October, 2015

Michelle K. Lee  
*Director of the United States Patent and Trademark Office*